United States Patent [19]

Lee

[11] Patent Number: 5,450,450
[45] Date of Patent: Sep. 12, 1995

[54] ASYNCHRONOUS DATA TRANSMITTING AND RECEIVING SYSTEM

[75] Inventor: Xiaoyang Lee, New York, N.Y.

[73] Assignee: Panasonic Technologies, Inc., Princeton, N.J.

[21] Appl. No.: 40,481

[22] Filed: Mar. 31, 1993

[51] Int. Cl.⁶ .............................................. H04L 7/00
[52] U.S. Cl. ..................................... 375/354; 375/364; 370/100.1
[58] Field of Search ................. 375/110, 94, 120, 118, 375/117, 111, 113, 59, 106, 114, 116; 370/94.1, 60, 105.5, 105.4, 105.5, 100.1

[56] References Cited

U.S. PATENT DOCUMENTS

| | | | |
|---|---|---|---|
| 4,459,701 | 7/1984 | Lamiral et al. | 375/110 |
| 4,748,623 | 5/1988 | Fujimoto | 375/114 |
| 4,748,643 | 5/1988 | Setoguchi et al. | 375/117 |
| 4,958,228 | 9/1990 | Kutsuki | 375/114 |

Primary Examiner—Stephen Chin
Assistant Examiner—Tesfaldet Bocure
Attorney, Agent, or Firm—Amster, Rothstein & Ebenstein

[57] ABSTRACT

A system and method for the transmission and recovery of asynchronous data. For instantaneous synchronization, the receiver is equipped with a high frequency timing base which has a far higher frequency than either the data-generating or transmitting rate. The receiver clock is instantly synchronized upon detection of the first transition of the incoming data packet. Data packet verification can be conducted and data processed with minimal loss of data.

4 Claims, 4 Drawing Sheets

ASYNCHRONOUS DATA TRANSMITTING AND RECEIVING SYSTEM

The invention relates generally to the transmission and receipt of asynchronous direct baseband transmissions. More specifically, it relates to a system for providing asynchronous data in packets which are transmitted at a rate which is lower in frequency than the data-generating frequency and substantially lower in frequency than the rate of the timing base at the receiving end, thereby allowing almost instantaneous synchronization and data recovery at the receiving end.

BACKGROUND OF THE INVENTION

To provide asynchronous data from a transmitting entity having a first transmitting frequency to a receiving entity, via wired or wireless transmission media, synchronizing information must be transmitted with the data in order to provide the receiving entity with the appropriate rate at which to receive and process the information. For a continuous data stream, it is extremely difficult to maintain synchronization of the regenerated clock signal at the receiver, due to the inherent instability over time of the standard clocking sources, such as crystal/crystal oscillators. As a consequence, most transmitted information is provided in non-continuous data packets which include not only the information bits but also a headcode having synchronizing bits to synchronize the receiver for processing of the information bits. Receivers generally require central processing units, CPU's, or microprocessors for receiving the synchronization codes and setting the receiver's clocking sources to the synchronization frequency. A high stability clock source is required to maintain the synchronization of receipt of the information to the transmitting rate to prevent loss of data. In addition, synchronization can be adversely affected by hardware time delays and noise encountered along the transmission medium, neither of which can be filtered out or otherwise accounted for by the CPU. Noise spikes cause false triggering of the receiver clock, either prematurely or at mid-transmission, activating the associated processing circuitry to begin processing of received data, which may or may not be any or all of the information data. The synchronization error caused by false triggering will result in loss of the entire data packet if processing is not correctly begun on the first information bit. Errors due to hardware delay and timing source instability contribute to an accumulated error which can affect the processing of more than just a single data packet.

What is required, therefore, is a system which can instantly synchronize the receiver for each transmitted data packet, thereby avoiding the affects of accumulated error. In addition, a means by which correct synchronization can be confirmed instantly will assure that losses are limited to the loss of a single data packet.

It is, therefore, an objective of the present invention to provide a data transmission and recovery system which provides instantaneous synchronization of the receiver upon detection of the first bit of an incoming data packet.

It is another, more specific objective of the present invention to provide a high frequency timing base at the receiver which will allow virtually instantaneous synchronization.

Yet another objective of the present invention is to provide a data transmission and recovery system which does not require a high stability timing source.

Still another objective of the present invention is providing a receiver for asynchronous data receipt and recovery which does not require the use of a microprocessor.

Still another objective of the present invention is to limit the potential losses of data to a single data packet when providing digital data from a transmitting end to a receiving end.

SUMMARY OF THE INVENTION

These and other objectives are realized by the present invention for transmission of asynchronous digital data to a receiver which samples the data at an extremely high rate. Transitions, representing the edge or first bit of incoming packets, can be virtually instantaneously detected and the related processing circuitry activated. For optimal effectiveness, the system additionally includes means to verify that the detected transition was indeed the first bit of a data packet before activating the data conversion circuitry.

BRIEF DESCRIPTION OF THE INVENTION

The invention will now be described in greater detail with specific reference to the accompanying drawings in which.

Figure 4:
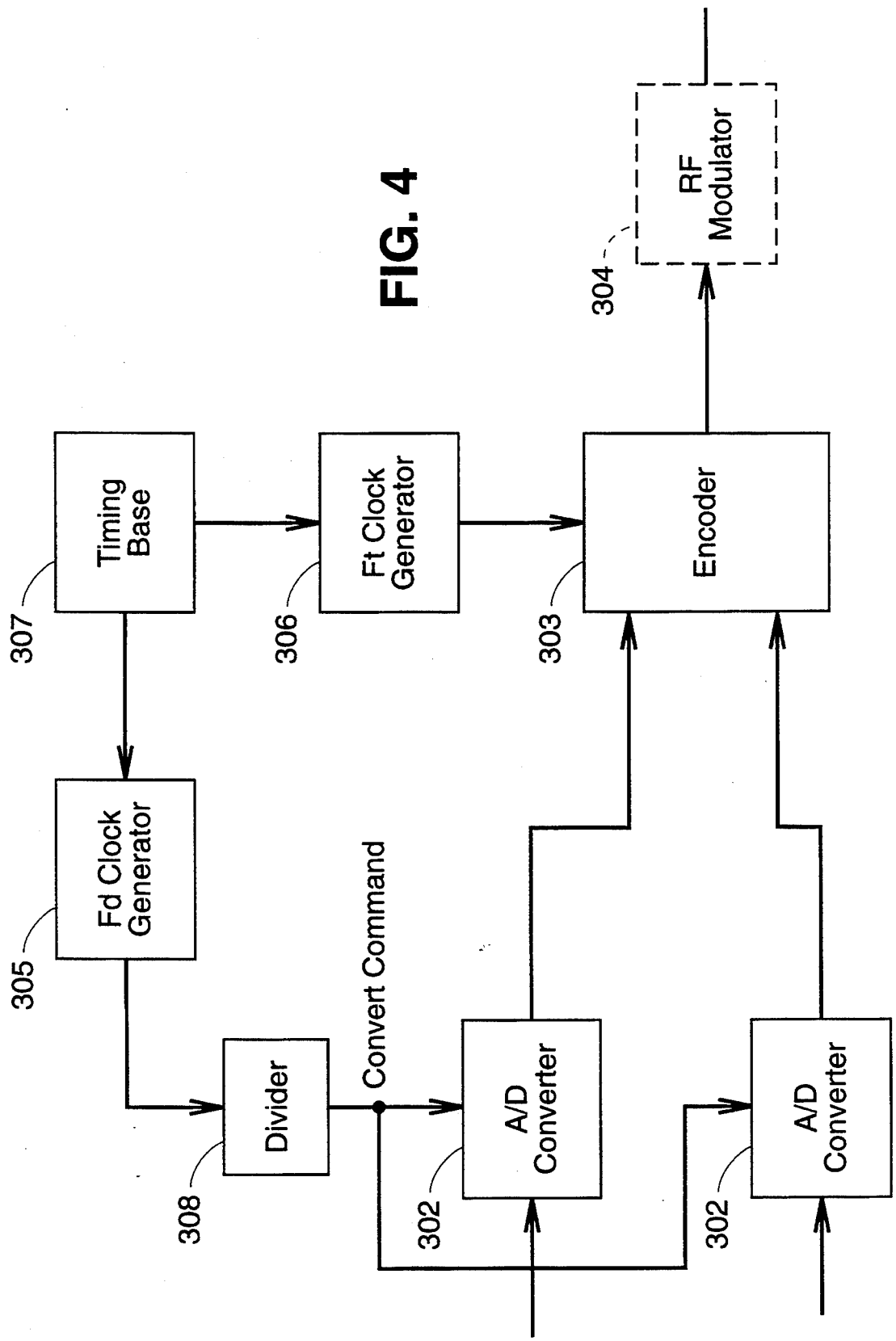

FIG. 4 provides a schematic block diagram of a transmitter for providing audio compact disc (CD) information.

DETAILED DESCRIPTION OF THE PREFERRED EMBODIMENT

In accordance with the present invention, the transmitter divides the continous baseband data stream, having a data rate of Fd, into sequential packets of information bits to be included in a series of data packets. The data packets are constructed in accordance with the standardized format, as further illustrated at 10 in FIG. 1, of:

<headcode> <information bits> <endcode>.

Figure 3:
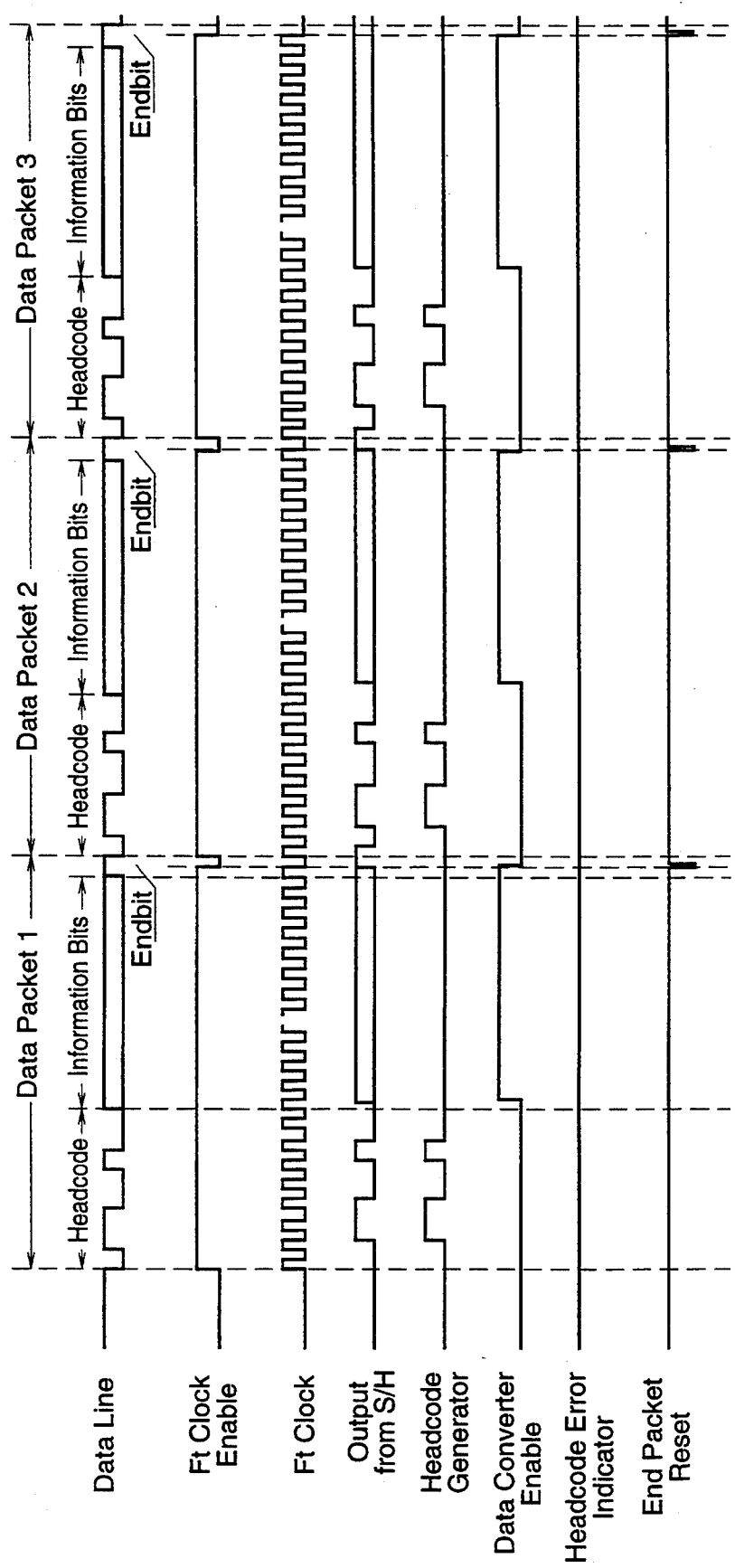
FIG. 3 illustrates a representative signal, whereby the standby level of a transmission line is "0" and a transition bit of an incoming signal, having a signal level of "1," can be detected at its rising edge, and wherein the encode bits are set to the standby level of the line.

The initial bit of the headcode, 12 is set opposite to the standby level for the data line to facilitate detection of the beginning of a data packet, for example, the initial bit will have a level of "1" which is opposite to the standby level of "0" for the line, as illustrated in FIG. 3. The balance of the headcode bits are not, therefore, required for synchronization information. The remaining headcode bits can, consequently, be set for packet recognition, as will be discussed further herein.

The information bits 14, "A" bits sent after the headcode, contain the information data which has been sequentially taken from the continuous asynchronous digital data at the transmitter for transmission to the receiver. Such digital information may include audio information, audio-video information, graphic display data, etc.

Finally, the endcode, 16, is provided after the information bits. The endcode is, generally, several bits which in the past have been used for error correction. In the present system, the endcode bits can be used to reset the system, with all endcode bits ideally being set to the standby level of the data line. At a minimum, the last bit of the endcode, and hence of the data packet, will be set to the standby level, as illustrated in FIG. 3, to facilitate detection of the transition at the initial headcode bit of the next incoming packet.

The complete packets, comprised of "B" total bits including headcode, information and endcode bits, is transmitted at a transmitting rate of Ft, with Ft>Fd, the data generating rate. Ideally, the relation between the data rate, Fd, and the transmission rate, Ft, is such that the bit time, Td, for generating "A" bits, "A" representing only the information bits, is the same as the transmitting time, Tt, for transmitting the packet comprising "B" bits, "B" representing all of the bits (i.e., headcode, information and endcode bits). Therefore, the data packet transmission time for all bits at a transmission rate of Ft is equal to the total time for generating just the "A" information bits, cut from the continuous data stream, at the data rate Fd. The transmitted data packet will, consequently, be supplied at the same net rate as the continuous data stream and the information therein processed at the receiving end as if in a continuous data stream, in accordance with the relation:

$$B*Tt = A*Td.$$

If, given a fixed data rate, Fd, and fixed transmission rate, Ft, the values for A and B cannot be found to satisfy the equation, the equation may be balanced as follows:

$$B*Tt + Tg = A*Td,$$

where Tg is the gap time between adjacent transmitted packets. A small gap introduced between adjacent packets will result in the transmitted data packets being non-continuous; but will not ultimately affect the rate at which the information contained therein is recovered at the receiving end.

At the receiving end of the system, a high frequency timing base is continually available. The sampling of incoming data can then be conducted utilizing at a much higher frequency base than Ft, the rate at which the data is transmitted. Consequently, the edge or transition from one level to another on the line is virtually instantaneously detected. The process for verifying that the detected edge is the first bit of a data packet can then be immediately commenced and the processing circuitry readied for receipt and conversion of the information in the data packet. It does not become necessary to include a microprocessor at the receiver for decoding synchronization data and programming a local clock requiring a high stability timing base. Rather, a simple ASIC may be employed which activates the local receiver clock to begin providing clock signals as soon as the transition or edge of the incoming data packet has been detected.

Figure 2:
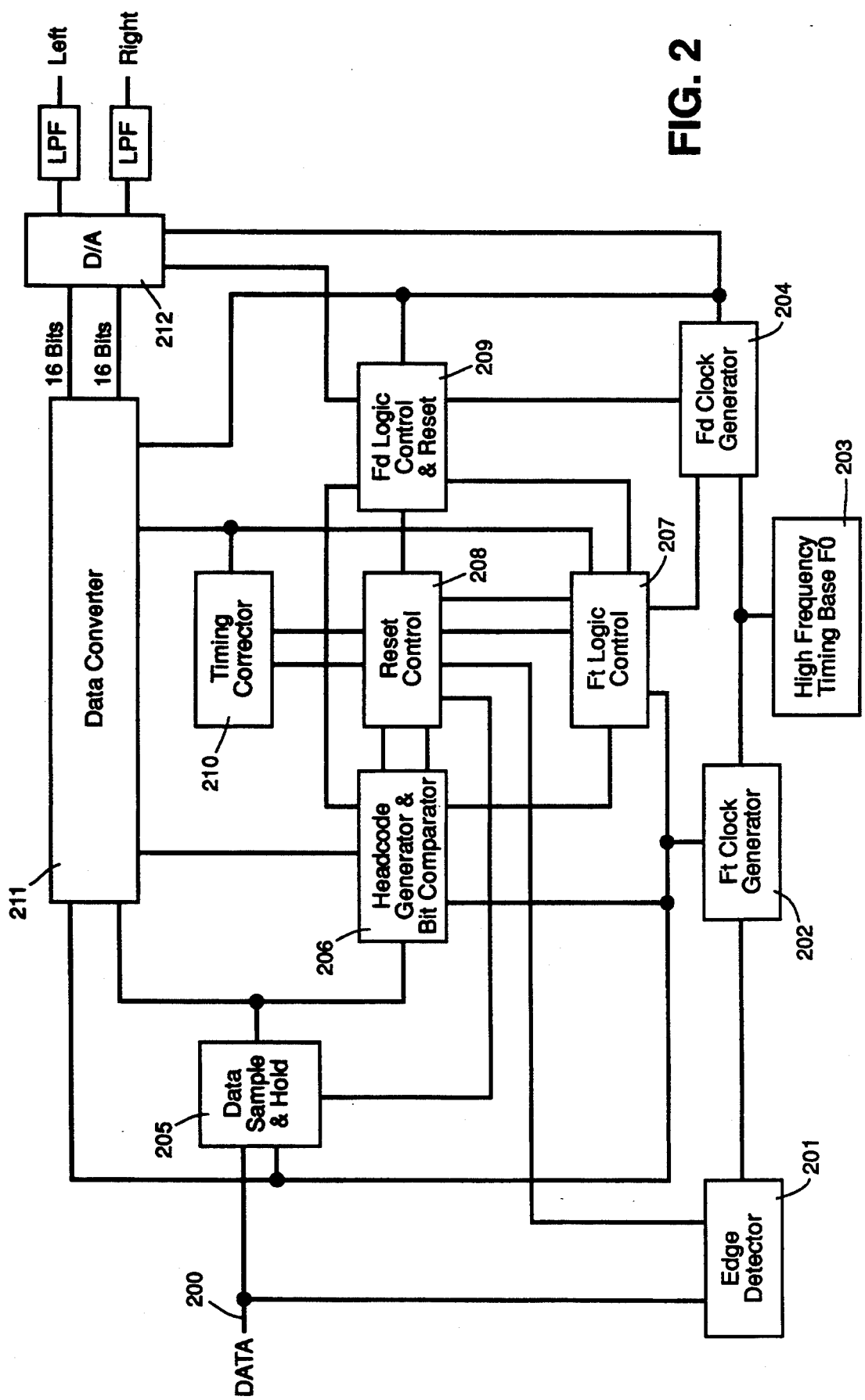
FIG. 2 shows a block diagram of the components of a receiver in accordance with the present invention.

With specific reference to FIG. 2, the clock synchronization and data recovery method is further detailed at the receiving end of the system. A data packet is provided to the receiver at the transmitter's fixed transmission rate, Ft, along data line 200 which is connected to the Edge Detector 201 and the Data Sample and Hold circuitry 205. The Edge Detector 201 determines if there is a transition change on the data line. As discussed above, the first bit of the headcode of the incoming data packet is set opposite to the standby level of the data line so that a transition, or edge, is instantly recognized. Once the first transition edge is detected, the Edge Detector sends a signal enabling the Ft' Clock Generator 202 and the Edge Detector is muted. The Data Sample and Hold Circuitry 205, also connected to receive data along data line 200, utilizes signals received from the enabled Ft' Clock Generator to synchronize the data and then supplies the synchronized data to the Headcode Generator and Bit Comparator 206 and to the Data Converter 211.

As soon as the Ft' Clock Generator 202, which has the continually operating High Frequency Timing Base F0 as its timing base, is enabled, it sends out the locally regenerated clock signal, Ft', having its rising edge first, to the Data Sample and Hold Circuitry at 205, Headcode Generator and Bit Comparator at 206, the Data Converter at 211, and the Ft' Logic Control at 207. The Ft' Clock Generator 202, along with the Fd' Clock Generator 204, is driven by a high frequency timing base F0, which is represented at 203. The high frequency timing base F0 may be supplied by a crystal/crystal oscillator or other clocking source which is able to provide the high frequency (F0>>Ft) needed for the present invention. Given the low stability requirement of the present system, as will be further discussed herein, a low cost crystal/crystal oscillator (e.g., having a stability of ±100 ppm) may be employed.

By definition herein, the high frequency F0 is chosen to be far greater than either the data rate, Fd, or the transmitting rate, Ft. The relationship of the frequencies being Fd=F0/M and Ft=F0/N, where M and N are integers. The M and N integers will additionally be employed in providing the locally regenerated clocks at the receiver, wherein the locally regenerated data frequency, Fd', will be Fd'=F0/M and the locally regenerated transmitting frequency, Ft', will be Ft'=F0/N, thereby minimizing the potential differences between the originating clocks and the clocks at the receiver.

The locally regenerated transmitted clock, Ft', is the output of the N divider in the Ft' Clock Generator 202 which is driven by the High Frequency Timing Base F0 203. The divider is enabled, upon signalling from the Edge Detector, by the first transition of the initial bit of each transmitted data packet, to provide the transmitted data clock Ft' virtually instantaneously. As indicated above, the value of the N divider is chosen in relation to F0 and Ft and provides a locally regenerated transmitted clock rate, Ft', which is most closely synchronized to the transmitted clock rate, Ft. By providing a continual high frequency timing base, F0, which is substantially faster than either the transmitted or data rates, the local clock generators, 202 and 204 with their N and M dividers respectively, can achieve synchronization at the receiver virtually instantaneuosly with a maximum timing difference between the Ft and Ft' of 1/F0+Td, with Td being any attendent hardware delays in the Ft' Clock Generator. Similarly, the maximum timing difference between Fd and Fd' will be 1/F0+Td', where Td' is the delay due to the Fd' Clock Generator hardware.

The Headcode Generator and Bit Comparator 206 receives the Ft' clock signals and analyzes the data received from Data Sample and Hold Circuitry 205 to establish that the incoming packet is a valid data packet. If not identified as valid, the conclusion must be that the Ft' Clock Generator has been enabled based upon detection of a "false" transition, for example from noise appearing on the data line or from a detected transition which is not at the beginning of a data packet. Data Sample and Hold Circuit 205, operating under the Ft' clock signal, outputs the synchronized data to the Headcode Generator and Bit Comparator 206. In the Headcode Generator and Bit Comparator 206, the bits succeeding the transition bit are subjected to a bit-by-bit comparison to a pre-set standard headcode pattern of bits, which pattern has been established for use in packet recognition of all data packets transmitted and recovered in the system. The pre-established standard provides headcode bit patterns which are inherently different from the patterns used in assembling bits for the information or endcode segments of data packets. Such coding patterns, or rules, facilitate the identification of detected transitions on the data line caused by noise or detected transitions which fall within the packet as opposed to being first-bit transitions.

If the incoming data bits, succeeding the detected transition bit, are identified by the Headcode Generator and Bit Comparator, as the headcode of a transmitted data packet, it can be concluded that the Ft' Clock Generator has not been triggered by either noise or a mid-packet transition, and that the "A" bits following the headcode are the information bits. The Headcode Generator and Bit Comparator 205 sends out a control signal to the Data Converter 211 to enable the input of the serial/parallel converter, which then receives the information bits from the Data Sample and Hold circuit 205.

Simultaneous to the signalling by the Headcode Generator and Bit Comparator, the Ft' Logic Control 207 starts sending out a sequence of control signals. If the headcode bits do not compare, as will be detailed later, the Ft' Logic Control will receive a signal from the Headcode Generator and Bit Comparator so that the sequence of Ft' Logic Control signals will not be generated. If the headcode bits do match, however, the Ft' Logic Control 207 sends a signal disabling the Headcode Generator and Bit Comparator after the last bit of the headcode has been compared to the standard and identified. As soon as the rising edge on the last bit of the information segment of the packet has been detected by the Ft' Logic Control, and the information bits therefore provided to the serial/parallel input of Data Converter 211, the Ft' Logic Control sends a pulse signal to the Data Converter 211 to begin processing of the data. The Ft' Logic Control additionally provides pulse signals to the Timing Corrector 210 and the Fd' Logic Control 209, which in turn enables the Fd' Clock Generator 204 to provide the locally regenerated data clock, Fd', using the F0 timing base and an "M" divider, to the Data Converter 211.

The Timing Corrector 210, receiving a pulse signal from the Ft' Logic Control, counts the number of packets received. After a requisite, preset number of packets have been received, the Timing Corrector sends a signal to the Reset Control 208. The Reset Control will accordingly send signals to reset the Edge Detector 201, the Ft' Logic Control 207 and the Headcode Generator and Bit Comparator 206. The Edge Detector will, in turn, send out a signal to disable the Ft' Clock Generator 202 and the receiver will be ready to detect the next transition change on the data line. Essentially, therefore, the Timing Corrector signals the end of the receiving of a data packet. The Timing Corrector may be adjusted to reset after the system has received a single packet or any preset number of packets. The reset cycle is chosen to limit the accumulated timing difference induced by the instability of the data clock in the receiver or by the uncertainty of the data clock in the transmitter. The maximum value for the reset cycle is dependent upon several factors including not only the stability of the High Frequency Timing Base F0, but also the ratio of F0 to Ft, and the length of the packet. The receiver can be reset after every packet, thereby assuring synchronization for every packet and no accumulated timing error carrying from one transmission to the next, since Ft' is reset for every packet. On the other hand, assuming a stable clocking source, F0, which has a value which is substantially greater than the transmission rate, it is not necessary to continually reset the locally regenerated clock since both clock-related delays and hardware delays will introduce nominal errors, in the range of 1/F0 per packet, which will not have a significant cumulative effect.

At the same time that the Timing Corrector is receiving the pulse signal from the Ft' Logic Control and counting, the Fd' Logic Control and Reset 209 is also receiving a pulse signal from the Ft' Logic Control 207. Once the pulse signal has been received at 209, the Fd' Logic Control and Reset enables the Fd' Clock Generator 204 which will send out the rising edge of the Fd' clock immediately. As described above, the Fd' clock is driven by the High Frequency Timing Base F0, 203, as is the Ft' clock. The F0 base is divided by an M divider in the Fd' Clock Generator 204 to provide the locally regenerated data clock, Fd'. The Fd' clock is provided to the Fd' Logic Control 209, the Data Converter 211 and the Digital-to-Analog (D/A) converter 212.

The Data Converter 211 which is illustrated provides two major functions: serial to parallel conversion and parallel to serial conversion. Clearly, when the Data Converter is providing its output to connected circuitry or components which can receive parallel inputs, a more simple Data Converter would be employed. For the sake of illustration herein, however, a common S/P-P/S unit for serial output is described. The serial to parallel, S/P, converter in Data Converter 211 is used for extracting channel information bits from the received data packets and works under the Ft' clock. After all information bits have been shifted into the shift register of the S/P converter, the S/P converter downloads the information bits into the parallel to serial, P/S, converter by using the control signal sent out from the Ft' Logic Control. The rising edge of the pulse signal from the Ft' Logic Control triggers the "downloading" of the information bits into the parallel/serial (P/S) converter input. The P/S converter operates under the data clock, Fd', generated at Fd' Clock Generator 204. In the P/S converter, the serial channel data will be extracted, assuming, for the sake of example, the need to separate left/right channel information in this manner. The serial data stream is sent out at the rising edge of the clock signal Fd' providing the left/right channel serial data stream for the Digital-to-Analog Converter (D/A), 212, which reconstructs the high quality analog signal. The data output to the D/A Converter is delayed one packet length after the data packet has been received at the receiver. A clocking pulse is provided from the Fd' Control Block for timing the loading of the digital data into the D/A Converter and for resetting the Fd' Logic Control itself after all bits have been loaded into the D/A Converter.

The Fd' Logic Control 209 generates a narrow pulse for every preset number of Fd' clock cycles. This pulse is used for loading the digital data into the D/A converter 212 and for resetting the Fd' Logic Control itself. The preset number is related to the information data; for example, if the information data is dual left/right channel information for a compact disc (CD) system having 16-bit resolution per channel, the Fd' Logic Control 209 would generate a pulse for every 16 Fd' clock cycles with the pulse being used for loading dual 16-bit data to the D/A converter for provision to the left and right audio outputs. Upon the last pulse, the Fd' Logic Control resets itself.

After the rising edge of the last bit of the packet is detected, the Ft' Logic Control 207 sends out a control signal to Reset Control 208. The Reset Control will send the signal to reset the Headcode Generator and Bit Comparator 206, the Data Sample and Hold Circuit 205, the Ft' Logic Control 207 and the Edge Detector 201. As described above, the Edge Detector 201 will disable the Ft' Clock Generator 202 and await the next transition on the data line.

If, during the bit-by-bit comparison, the Head Code Generator and Bit Comparator 205 finds any bit which does not match the related bit of the headcode standard, it provides a signal to the Fd' Logic Control 209 and to the Reset Control 208 to immediately reset the system, disabling the Ft' Local Clock Generator 202 and re-enabling the Edge Detector, 201. The Reset Control generates a sequential command to reset the Edge Detector 201, the Headcode Generator and Bit Comparator 206, the Data Sample and Hold Circuitry 205, Timing Corrector 210 and the Ft' Logic Control 207 immediately. The Fd' Logic Control will reset itself immediately unless the Fd' Clock Generator is already enabled. If the Fd' Clock Generator is enabled, a previous data packet must still be in processing and cannot be destroyed. Therefore, the Fd' Logic Control will not be reset until it has received its own control signal, as described above.

Given the fact that the Headcode Generator and Bit Comparator 206 does a bit-by-bit comparison to check and identify the incoming signal, incorrect transition detection is immediately recognized in the system as detailed above, so that the maximum number of missed data bits will only be the balance of bits in a single data packet.

Figure 1:
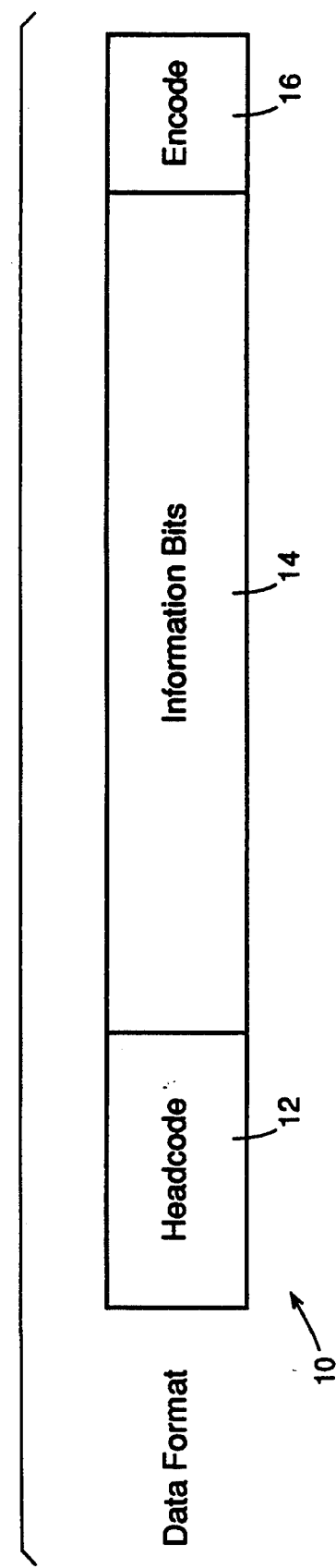
FIG. 1 illustrates a data packet format for use with the present invention.

For application of the invention to a system, by way of example, for transmitting audio CD information, a 40-bit packet, in the format illustrated in FIG. 1 is constructed in the transmitter as schematically illustrated in FIG. 4. Since the quality of a CD recording cannot be maintained through transmission of analog information, the analog signal must be digitized. In the transmitter, as shown in FIG. 4, the analog digital signal is converted into a digital signal using at least one A/D (analog-to-digital) converter 302 having 16-bit (CD quality) resolution. The outputs of the A/D converters 302 are two continuous data steams, one each carrying the left and the right channel information. The separated left and right channel data streams are provided to an encoder 303 in which they are time multiplexed and reconstructed into a single stream of 40-bit data packets at a data rate of Fd from Fd Clock Generator 305. With reference once again to FIG. 1, the 40-bit packet 10 includes a 6-bit headcode, 12, for data clock synchronization and data packet recognition, 32 bits of multiplexed dual audio channel information, 14, including 16 bits of left channel information and 16 bits of right channel information, and a 2-bit endcode, 16, for separating adjacent transmitted data packets and compensating for any data processing time delay incurred by the hardware circuitry. As further discussed herein, the last two bits of a packet are preferably set to the standby level of the data line, opposite to the setting of the first bit of every packet, thereby facilitating recognition of the transition at the first bit of each newly transmitted data packet by the Edge Detector in the receiver.

From the encoder 303, the continuous stream of data packets is provided for demodulation, by a standard modulator 304 such as the FSK single chip modulator of Motorola Co., for distribution or transmission at transmitting rate Ft from Ft Clock Generator 306 which ultilzes Time Base 307, as does Fd Clock Generator 305. In the receiver, the main functions, upon receipt of the FSK transmission, are the regeneration of the synchronized clocks, Ft' and Fd'; decoding of the incoming data packet; separation of the left and right channel data information; and, supplying the necessary control signals to the D/A converter. The receiver components would be essentially the same as those illustrated in the block diagram of FIG. 2, and the sequence of processing steps would be as described above. In the Data Converter 211, the left and right channel information would be extracted from the input data stream and provided to the D/A Converter under the locally regenerated data clock, Fd', and the analog signals from there eventually output on left and right speakers.

The invention has been described with reference to a prospective use, although it is envisioned that one having skill in the art will be able to apply the teachings to any asynchronous data transmission and recovery system without departing from the spirit and scope of the appended claims.

What is claimed is:

1. A method for receiving asynchronous data, generated at a first data rate and transmitted at a first transmitting rate, at a receiver having a clocking means for providing clocking signals and wherein said clocking means comprises continually running high frequency timing base means and first clock generator means, said receiving being conducted without oversampling said data, comprising the steps of:

detecting the first bit of said data at said receiver; and
   instantaneously generating said clocking signals at said clocking means by:
   generating high frequency timing base output from said high frequency timing base means upon detecting said first bit;
   providing said high frequency timing output to said first clock generator means; and
   generating said clocking signals by modifying said high frequency timing base outpour in said first clock generator means to approximate said first transmitting rate.

2. The method of claim 1 wherein said clocking means additionally comprises second clock generator means further comprising the steps of:

providing said high frequency timing base output to said second clock generator means; and
   generating data clock signals by modifying said high frequency timing base output in said second clock generator means to approximate said first data rate.

3. A method for transmitting data over a data line from a transmitter comprising an encoder and a modulator to a receiver having a clocking means for providing clocking signals comprising high frequency timing base means and first clock generator means, said transmitting being at a first transmitting rate, and wherein said data has been generated as a continuous data stream at a first data generating rate lower than said first transmitting rate, comprising the steps of:

dividing said continuous data stream into a plurality of sequential packets of data bits in said encoder;

assembling said plurality of packets of data bits in said encoder into a plurality of transmission packets each comprising a headcode including a first transition bit, data bits and an encode;

transmitting each of said plurality of transmission packets at said first transmitting rate from said modulator;

detecting said first transition bit at said receiver;

generating high frequency timing base output from said high frequency timing base means upon detecting said first transition bit;

providing said high frequency timing base output to said first clock generator means; and generating said clocking signals by modifying said high frequency timing base output in said first clock generator means to approximate said first transmitting rate.

4. The method of claim 3 wherein said clocking means additionally comprises second clock generator means further comprising the steps of:

providing said high frequency timing base output to said second clock generator means; and generating data clock signals by modifying said high frequency timing base output in said second clock generator to approximate said first data generating rate.

* * * * *